No. 611,215. Patented Sept. 20, 1898.
S. HARRIS.
ELECTRIC CONTROLLER.
(Application filed May 2, 1898.)
(No Model.) 2 Sheets—Sheet 1.
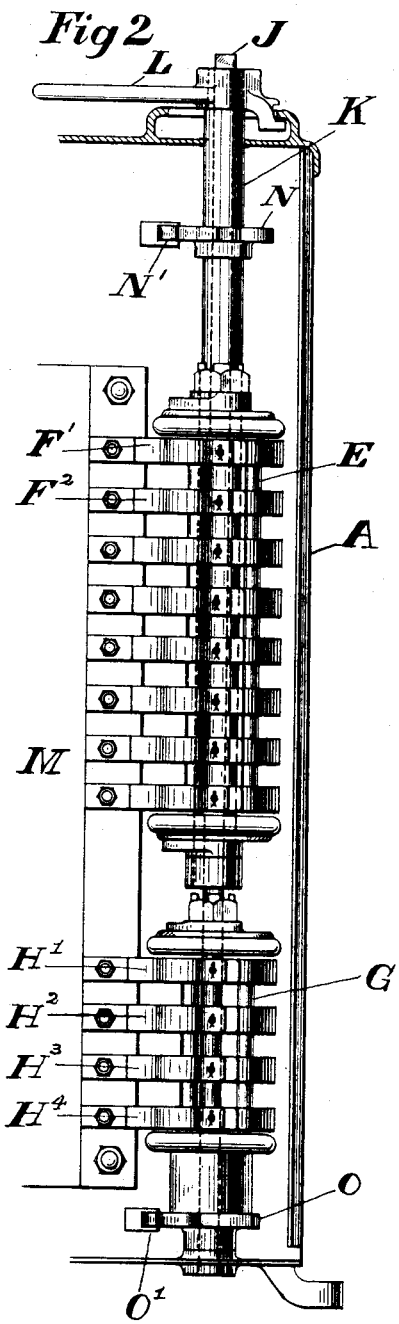
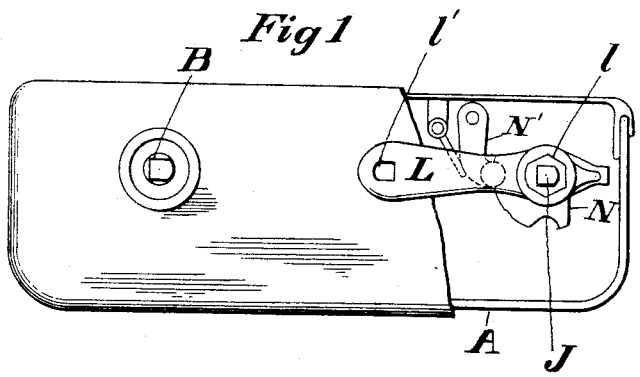
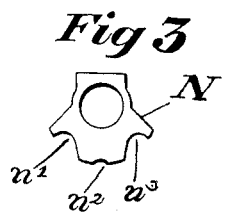
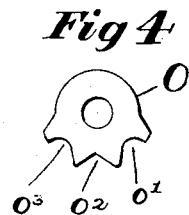
WITNESSES:
Myrtle E. Sharpe.
Fred A. Phelps Jr.
INVENTOR
Samuel Harris
BY
Richard Eyre
ATTORNEY.

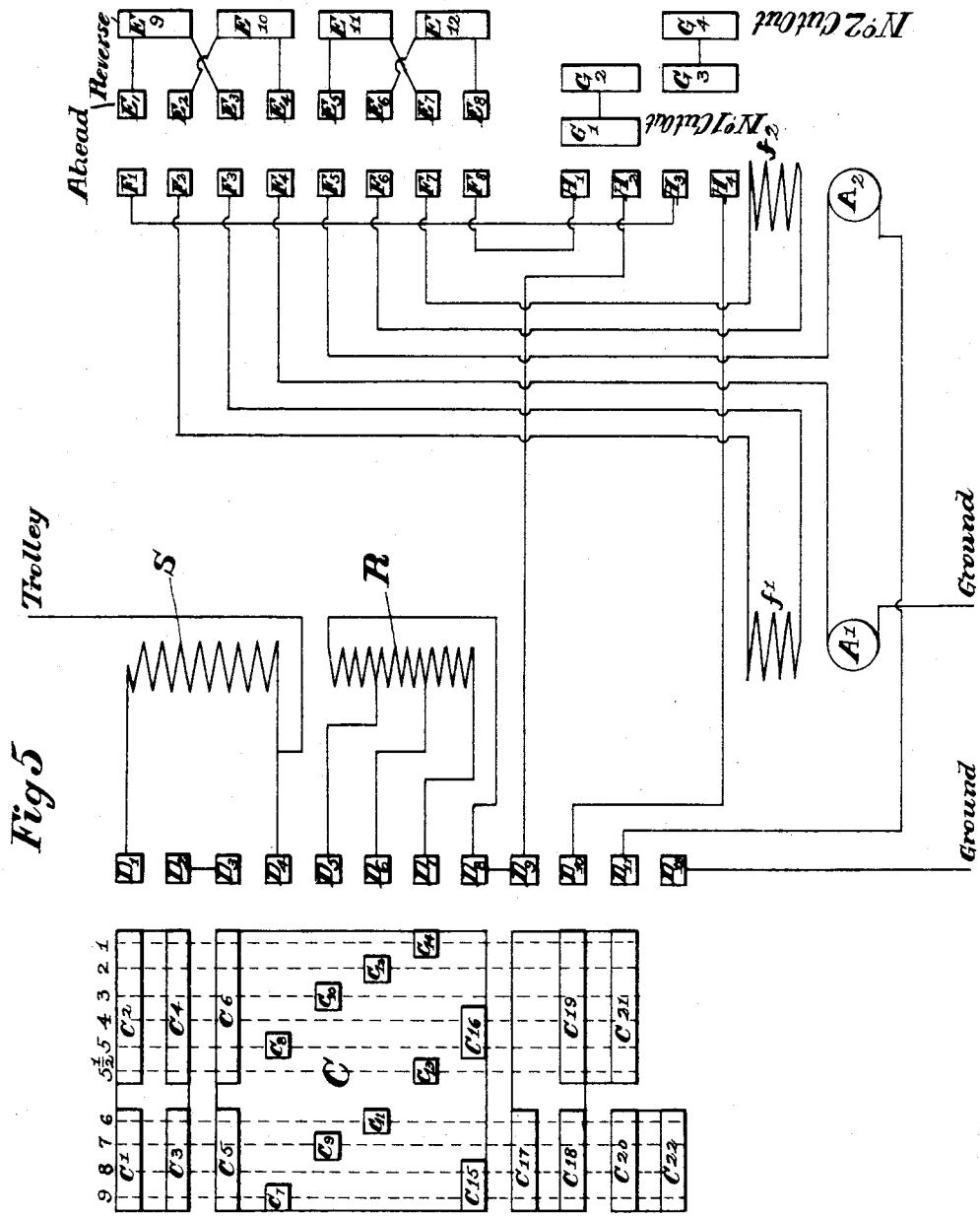

UNITED STATES PATENT OFFICE.

SAMUEL HARRIS, OF TWINSBURG, OHIO, ASSIGNOR TO THE STEEL MOTOR COMPANY, OF OHIO.

ELECTRIC CONTROLLER.

SPECIFICATION forming part of Letters Patent No. 611,215, dated September 20, 1898.

Application filed May 2, 1898. Serial No. 679,523. (No model.)

*To all whom it may concern:*

Be it known that I, SAMUEL HARRIS, of Twinsburg, in the county of Summit and State of Ohio, have invented a new and useful Improvement in Electric Controllers, of which the following is a full, clear, and exact description, reference being had to the accompanying drawings, which form a part of this specification.

My invention relates to electric controllers of the type generally used upon electric-railway cars to regulate the operation of the motors. In controllers of this class it is usual to provide a series-parallel control-switch, which is adapted to effect certain changes in the connections between the motors and their connections to resistances, &c., a reversing-switch, which is connected into the circuit in such a manner that it regulates the direction of rotation of the motors, and cut-out switches by the use of which either motor alone or both motors together may be used to propel the car, so that if either motor is disabled the control-switch may be manipulated to actuate the cars by means of the remaining motor, the disabled motor being completely cut out of the main circuit. The cut-out switches, like the control and reversing switches, have been usually placed inside the casing of the controller. They are not often manipulated, and it has therefore been considered too expensive to enlarge the controller sufficiently to have additional shafts and operating-levers for the cut-out switches. As a result it has usually been necessary, in case the cut-out switches are to be manipulated, to open the controller-casing to actuate them. A further disadvantage of this construction is that it is not advantageous to use the durable form of drum-switch for this purpose, as the switch must be manipulated from inside the casing, so that two double-pole knife-switches have been usually employed. These are expensive and not extremely durable. The necessity of removing the casing has been obviated in prior constructions by placing six rows of contacts on the drum of the reversing-switch instead of the two needed for simple reversal. By turning the switch to any of the four additional positions one or other of the motors is cut out of circuit. This construction, however, requires a larger and heavier switch, and it is extremely desirable to attain the same general objects at greater economy and with a reduction of the weight of the controller.

The particular object of my invention, therefore, is to provide a construction which will have the advantages of the combined reversing and cut-out switch at a great saving in the size, weight, and number of parts. To attain this object, I provide two concentric shafts, upon one of which I mount the movable member of a reversing-switch, said movable member having but two rows of contacts, and on the other of which I mount the movable member of a cut-out switch, said movable member having three vertical rows of contacts and only a small number of horizontal rows. The two concentric shafts pass through the top of the controller-casing, and a single operating-lever is provided by means of which either shaft may be rotated.

Subsidiary objects of my invention will appear more fully hereinafter and arise from the arrangement of the fixed and stationary contacts of the three switches in their relation to each other and the motors on the car.

Referring to the drawings, Figure 1 is a top view, partly broken away, of a controller embodying the features of my invention. Fig. 2 is a vertical section of a part of the same, showing in side elevation the reversing and cut-out switches, &c. Fig. 3 shows the indicator of the reversing-switch, and Fig. 4 the indicator of the cut-out switch. Fig. 5 is a diagram showing the arrangement of the contacts in the controller and the connection therefrom to the motors, resistances, &c.

The controller-casing is represented by A.

B shows the end of the shaft of the control-switch.

C, Fig. 5, shows a development of the drum of the control-switch D' to $D^{12}$, being the stationary contact-fingers which contact with the contacts upon the control-drum. The mechanical construction of this control-switch is not here shown, as it may be of any of the old and well-known types and forms no part of the present invention.

E represents the moving member of the reversing-switch, which I have shown, as I prefer to construct it, in the form of a cylinder or drum carrying contacts $E'$ $E^2$, &c.

$F'$ $F^2$, &c., represent the fixed contact-fingers of the reversing-switch, which engage with one or other of the two vertical series of E contacts, according to the position of the drum carrying the latter.

G represents the drum of the cut-out switch, carrying contacts $G'$, $G^2$, $G^3$, and $G^4$, arranged so as to make three vertical series adapted to contact with the four stationary contact-fingers $H'$, $H^2$, $H^3$, and $H^4$.

J is the shaft upon which is secured the drum G of the cut-out switch, and K is a tubular shaft surrounding shaft J and carrying the contact-carrying drum E of the reversing-switch.

L is an operating-lever, adapted at 1 to engage the top of the shaft K and adapted at 1 1 to engage the upper end of shaft J. By this arrangement only one operating-lever is needed for both switches, because it is not often necessary to actuate the cut-out switch, and when it is necessary the operator need only remove the lever L from one shaft and insert the other end in engagement with the other shaft. I have shown an exceedingly simple form of construction for this purpose; but it is clear that many other forms of mechanism might be provided to obtain the same object. I prefer to place the F fingers of the reversing-switch and the H fingers of the cut-out switch on the same finger-board M.

N is the reversing-switch, having depressions $n$ and $n'$, corresponding to the operating positions of the switch, and a smaller depression $n^2$, corresponding to the "off" position of the switch. One of these depressions is always engaged by a spring-pressed pawl in any suitable manner.

O is a similar index for the cut-out switch, having depressions $o'$, $o^2$, and $o^3$, corresponding to the three operating positions of the switch. One of these depressions is always engaged by the spring-pressed pawl $O'$.

In the diagram, $A'$ and $A^2$ represent the armatures of motors Nos. 1 and 2, respectively. $f'$ and $f^2$ represent the respective field-coils of the same.

R represents a resistance which is adapted to be placed in series with the motors, and $C'$ $C^2$, &c., represent the contacts carried by the drum of the control-switch.

S represents the coil of an electromagnetic-arc interrupter. The opposite sides of the main circuit are represented by the words "Trolley" and "Ground," respectively.

Let us suppose that the D contact-fingers are bearing against the dotted line 1 of drum C, that the F fingers of the reversing-switch are bearing against the series of E contacts marked "Ahead," and that the H contact-fingers are bearing against contacts $G^2$ and $G^3$. The course of the current would then be as follows: trolley, S, $D'$, $C^2$, $C^4$, $D^2$, $D^3$, $C^6$, $C^{14}$, $D^7$, R, $D^8$, $D^9$, $H^2$, $G^2$, $H'$, $F^3$, $E^8$, $E^{12}$, $E^6$, $F^6$, $f^2$, $F^7$, $E^7$, $E^{11}$, $E^5$, $F^5$, $A^2$, $D^{11}$, $C^{21}$, $C^{19}$, $D^{10}$, $H^4$, $G^3$, $H^3$, $F'$, $E'$, $E^9$, $E^3$, $F^3$, $f'$, $F^2$, $E^2$, $E^{10}$, $E^4$, $F^4$, $A'$, ground. In this position it will be observed that the current passes through both motors in series and also through a suitable resistance. If the control-switch and reversing-switch are in the same position, but the cut-out switch is in position marked "No. 1 cut-out," the current is the same until $H^4$ is reached, and as there is no G contact to engage $H^4$ the circuit is open at this point, so that motor No. 2 is in connection with one side of the circuit. This therefore is an inoperative position. When, however, the D contacts are bearing on dotted line 6, it will be seen that the current may pass through $A^2$ $D^{11}$ to $C^{20}$ and $C^{22}$, thence to $D^{12}$ and ground, completing the circuit through No. 2 motor, while still retaining No. 1 motor entirely disconnected from the circuit. Positions 7, 8, and 9 only differ from position 6 in that they successively cut out more resistance and finally short-circuit the blow-out coils S. If now the D contacts are again in position 1, while the cut-out switch is at position "No. 2 cut-out," the circuit from the trolley to $H^2$ is closed, as before; but as $H^2$ is not bearing against any of the G contacts both motors are out of circuit. If, however, the control-switch is now turned to position 6, the circuit becomes closed between $D^9$ and $C^{17}$, thence by $C^{18}$ and $D^{10}$ it may pass to $H^4$, by which means a circuit through motor No. 1 is established, because $H^3$ and $H^4$ are connected by contact $G^4$ just as they were connected by contact $G^3$ in the position first set forth. A circuit is therefore established at position 6 through No. 1 motor, while No. 2 motor is cut completely out of circuit. By turning the reversing-switch from the position "ahead" to the position "reverse" it is clear that the only changes made in the circuit are as follows: $F'$ is connected to $F^2$ instead of to $F^3$, $F^4$ is connected to $F^3$ instead of to $F^2$, $F^5$ is connected to $F^6$ instead of to $F^7$, and $F^8$ is connected to $F^7$ instead of to $F^6$. It is clear that the only variation in the circuits effected by these differences in the interconnections of the F contacts is that the current is passed through the fields in a direction opposite to that in which it passed before, thus reversing the direction of rotation of the motors.

I believe that I have now fully set forth the nature of my improvements and their mode of operation. It will be seen that I effect all the necessary changes desired in apparatus of this kind with a minimum number of switches and contacts and with a very simple arrangement thereof.

It is obvious that many modifications which are within the scope of my invention will readily suggest themselves to those skilled in the art. I do not, for example, mean to limit myself to the particular arrangement shown, whereby positions 1 to $5\frac{1}{2}$, inclusive, are inoperative positions when either motor is cut out, for it would need only a slight modification of contacts to operate one motor in these positions. I believe, however, the arrangement shown is a preferable one. Moreover, while I have shown the direction of rotation of the motors reversed by reversing the direction of the current through the field-coils it is of course obvious that I may instead reverse the direction of the current through the armatures. It is also clear that it is entirely immaterial to my invention whether there are two motors or more controlled by the apparatus shown, since it requires no change of importance to place more than one in each circuit, if desired.

Having thus described my invention, what I claim, and desire to protect by Letters Patent, is—

1. The combination in an electric controller of a pair of concentric shafts, a pair of switch-cylinders carried thereby, two sets of fixed fingers engaging therewith, and a single mechanism arranged to actuate either of said shafts.

2. In an electric controller, a reversing-switch comprising a set of fixed contacts, a moving member carrying contacts adapted to engage with the fixed contacts, and a shaft to which the said moving member is secured, in combination with a motor cut-out switch comprising a set of fixed contacts, a moving member carrying contacts adapted to engage with the fixed contacts, and a shaft to which the last-mentioned moving member is secured, the said shafts being concentric with each other, and an operating-lever adapted to engage and actuate either of said shafts.

3. The combination in an electric controller of three rotatable shafts, a control-cylinder carried by one of said shafts, a reversing-cylinder carried by the second of said shafts, and a cut-out cylinder carried by the third of said shafts, the two last-mentioned shafts being concentric with each other.

4. The combination with a pair of motors and their resistances, of a control-switch, a reversing-switch and a switch for cutting either motor out of circuit, a pair of concentric shafts to which the moving members of the two last-mentioned switches are secured, and a single actuating means for both of said shafts.

5. A cut-out switch comprising a series of stationary contacts, a contact-carrying cylinder and a shaft carrying the cylinder, in combination with a reversing-switch comprising a series of stationary contacts, a contact-carrying cylinder and a tubular shaft carrying said last-mentioned cylinder and surrounding the aforesaid shaft, and an operating-lever adapted to engage and actuate either of said shafts.

6. In an electric controller, in combination, a finger-board, two sets of contact-fingers secured thereto in the same vertical plane, a pair of concentric shafts, a cylinder secured to one of the shafts and adapted to engage with one of the sets of fingers and thereby govern the direction of rotation of the motors, and a second cylinder secured to the other of the shafts and adapted to engage with the other set of fingers and thereby govern the number of motors connected into the circuit.

7. In an electric controller, in combination, a finger-board, two sets of contact-fingers secured thereto in the same vertical plane, a pair of concentric shafts, a cylinder secured to one of the shafts and adapted to engage with one of the sets of fingers and thereby govern the direction of rotation of the motors, and a second cylinder secured to the other of the shafts and adapted to engage with the other set of fingers and thereby govern the number of motors connected into the circuit, and an operating-lever adapted to engage and actuate either of the said shafts.

In testimony whereof I have affixed my signature in presence of two witnesses.

SAMUEL HARRIS.

Witnesses:
 S. H. MORGAN,
 M. M. GALLAUDET.